May 13, 1924.
G. MUELLER
SCREEN BOTTOM BAKING TRAY
Filed Dec. 29, 1921
1,493,695
2 Sheets-Sheet 1
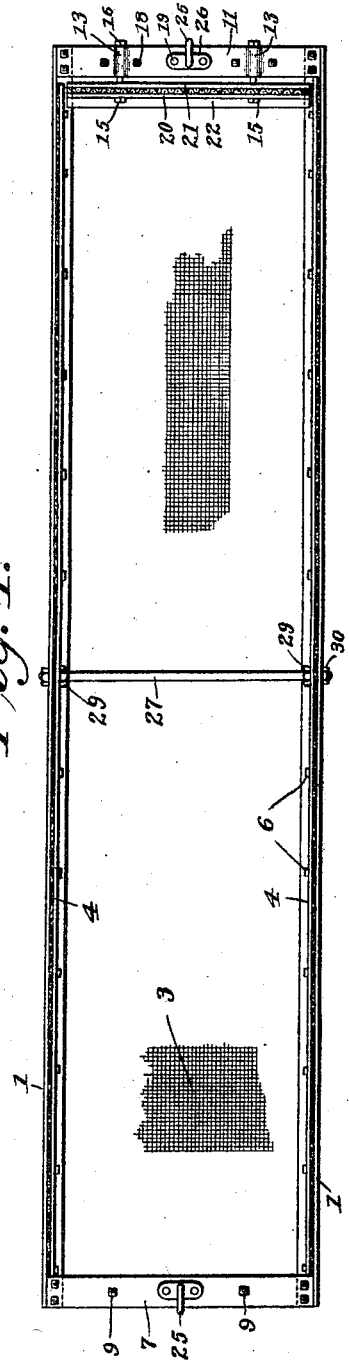
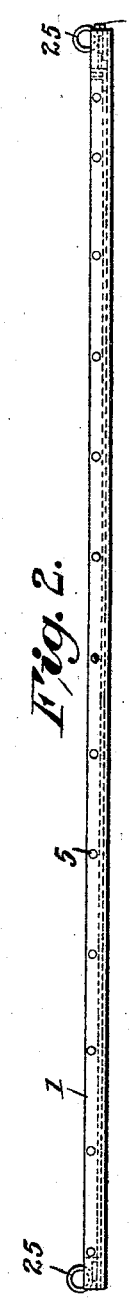
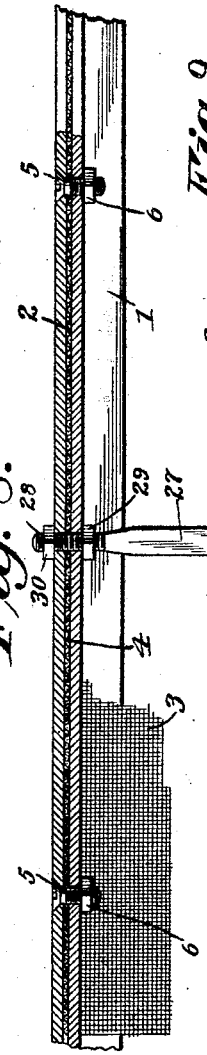
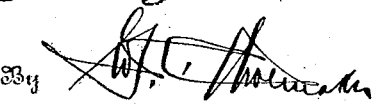
Inventor
George Mueller,
By
Attorney May 13, 1924.
G. MUELLER
SCREEN BOTTOM BAKING TRAY
Filed Dec. 29, 1921
1,493,695
2 Sheets-Sheet 2
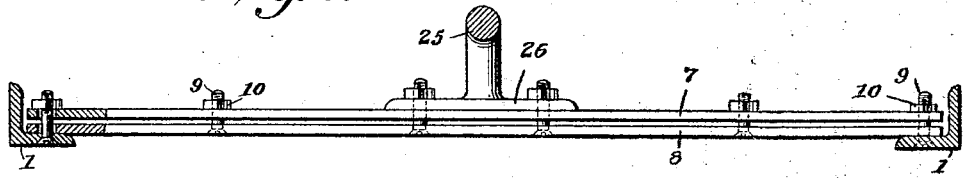
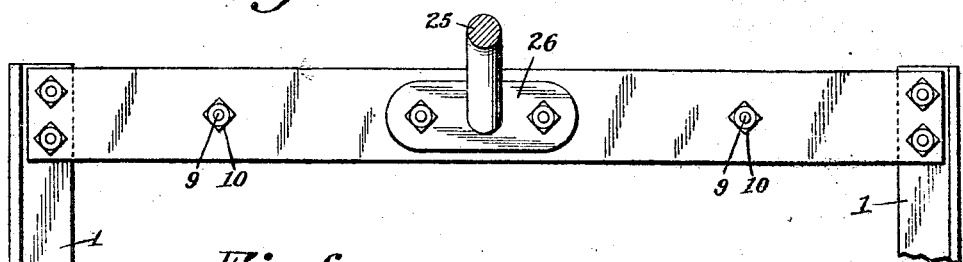
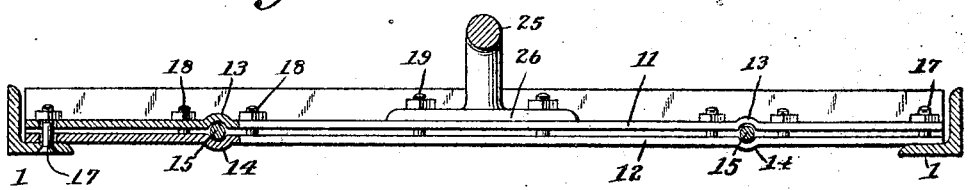
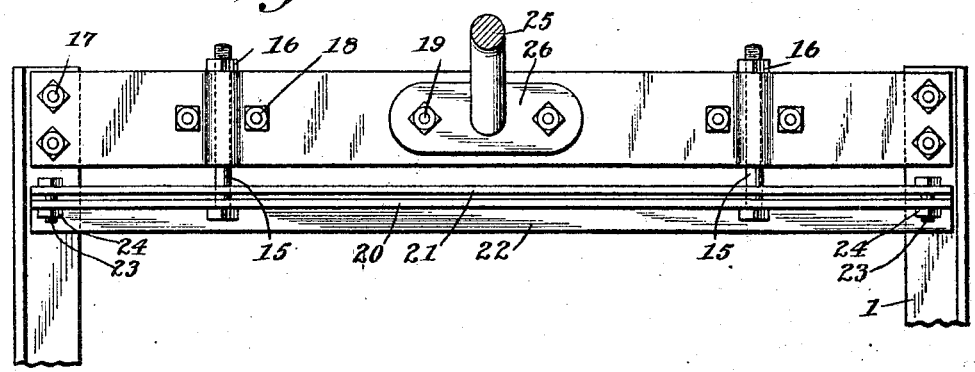
George Mueller, Inventor
By _____ Attorney Patented May 13, 1924.

1,493,695

UNITED STATES PATENT OFFICE.

GEORGE MUELLER, OF SALT LAKE CITY, UTAH.

SCREEN-BOTTOM BAKING TRAY.

Application filed December 29, 1921. Serial No. 525,584.

*To all whom it may concern:*

Be it known that I, GEORGE MUELLER, a citizen of the United States, residing at Salt Lake City, in the county of Salt Lake, State of Utah, have invented new and useful Improvements in Screen-Bottom Baking Trays, of which the following is a specification.

The invention relates to a screen bottom tray for baking bread, rolls and the like.

The object of the present invention is to improve the construction of screen bottom baking trays and to provide a simple, practical and efficient screen bottom baking tray of strong and durable construction designed for use in bakers' ovens for baking rolls, biscuits and the like and equipped with means for anchoring or fastening the screen material at one end of the tray and for adjusting or taking up the material at the opposite end of the tray whereby the screen material may be stretched to the desired tension and maintained in a taut condition in proper relation to the frame work of the tray.

Another object of the invention is to provide a screen bottom baking tray of this character adapted to save time and labor by enabling an entire batch of rolls to be handled at one time in placing them and removing them from an oven and capable, after the rolls or the like have been proofed and placed in the tray, of obviating the necessity of handling the same or disturbing the fermentation of the rolls so that a roll of the maximum size will be produced.

It is also an object of the invention to provide a screen bottom baking tray which, after the rolls or the like have been placed on it, may be easily and quickly placed into the oven and removed therefrom after the rolls have been properly baked.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings, in which like characters of reference designate corresponding parts in the several views:

Figure 1 is a plan view of a screen bottom baking tray in accordance with this invention.

Figure 2 is a side elevation of the same.

Figure 3 is an enlarged plan view, partly in section, of one end of the frame of the tray.

Figure 4 is a similar view of the other end of the tray.

Figure 5 is a transverse sectional view, partly in elevation, showing the anchoring end of the tray.

Figure 6 is a similiar view showing the adjusting or take-up end of the tray.

Figure 7 is an enlarged detail sectional view through one side of the tray.

Figure 8 is an enlarged horizontal sectional view through one side of the tray.

Figure 9 is a detail sectional view illustrating the manner of securing the truss or connecting rod to the side bars of the frame.

In the accompanying drawings in which is illustrated the preferred embodiment of the invention the screen bottom baking tray which is designed for baking rolls, biscuits and the like, comprises in its construction angle side bars 1 having inwardly extending horizontally disposed wings or flanges and vertically disposed upwardly extending wings or flanges against which the marginal side bars 2 of a screen bottom 3 are secured by inner clamping bars 4 and bolts 5 or other suitable fastening devices which pierce the upwardly extending wings or flanges, the marginal side bars 2 of the screen bottom and the inner clamping bars 4, as clearly illustrated in Figure 7 of the drawings. The bolts are preferably provided with flat heads and are countersunk in the wings or flanges of the angle side bars and they are provided at their inner ends with nuts 6. By means of the bolts 5 and the clamping bars the side portions of the screen bottom 3 are securely fastened to the angle side bars of the frame. The horizontal wings or flanges of the angle side bars extend beneath and support the adjacent portions of the screen bottom, as shown.

The screen bottom 3 is fastened or anchored at one end of the frame of the baking tray by means of flat upper and lower connecting bars 7 and 8 between which the end portion of the screen bottom is firmly clamped by bolts 9 which are arranged at intervals, the end bolts piercing the horizontal wings or flanges of the angle side bars. The intermediate bolts pierce the flat horizontal connecting bars 7 and 8 and all of the bolts are provided at their upper ends with nuts 10. The heads of the end bolts 9 are countersunk in the horizontal wings or flanges of the angle side bars, while the heads of the other bolts are countersunk in the lower connecting bar 8.

The frame of the tray is equipped at its other or take-up end with flat transverse upper and lower bars 11 and 12, which are provided at opposite sides of the center with upwardly and downwardly bowed or bent portions 13 and 14 of substantially semi-cylindrical shape which form round horizontally disposed openings through which pass adjusting or take-up bolts 15 extending longitudinally of the frame of the baking tray and provided at their outer ends with adjusting nuts 16 and having heads at their inner ends. The upper and lower bars 11 and 12 are secured to the horizontal wings or flanges of the angle bars by bolts 17 and the said bars 11 and 12 are connected and clamped tightly together at opposite sides of the bowed or bent portions 13 and 14 by bolts 18 which are inverted and have heads countersunk in the lower bar 12, as clearly illustrated in Figure 6 of the drawings. The bowed or bent portions 13 and 14 form grooves at the inner opposed face of the bars 11 and 12 and the bolts 17 are also inverted and have their heads countersunk in the horizontal wings or flanges of the angle side bars. The flat connecting bars 11 and 12 are also secured together at the central portions by bolts 19 and all of the bolts of the bars 11 and 12 are provided at their outer ends with nuts as shown. Also the end bolts 17 are preferably arranged in pairs, as shown, as are the end bolts 9 at the anchoring end of the frame.

The adjusting or take-up bolts 15 pierce an inner transverse clamping bar 20 and a vertically disposed wing or flange 21 of an angle bar 22 having its horizontal wing or flange supported at the ends upon the horizontal wings or flanges of the angle side bars, whereby the transverse angle bar 22 is slidably mounted upon the frame of the tray. The adjustable end portion of the wire bottom is arranged upon the horizontal wing or flange of the transverse angle bar 22 and it extends upwardly between the vertical wing or flange 21 and the inner clamping bar 20 and is securely clamped between the inner clamping bar and the vertical wing or flange 21 of the angle bar 22 by means of central and end bolts 23 provided at their outer ends or heads and having nuts 24 at their inner ends. The clamping bolts 23 pierce the vertical wing or flange of the angle bar 22, the end portion of the screen bottom of the tray and the inner clamping bar 20. The clamping means formed by the angle bar 22 and the clamping bar is adjusted outwardly by means of the longitudinally disposed bolts 15 which are adapted to stretch the screen bottom to the desired tension and which are also adapted to maintain the screen bottom in a taut condition by taking up the slack or sag in the screen bottom. The bolts 15 are slidable in the openings or ways formed by the grooves or bends of the transverse bars 11 and 12 and the clamping means which engages the end of the screen bottom is slidable on the upper faces of the horizontal wings or flanges of the side angle bars of the frame of the tray.

The frame of the tray is provided at its ends with centrally arranged handles 25, preferably in the form of rings and provided at the base with flat attaching plates 26 which are secured to the end bars of the tray frame by means of the central bolts 9 at the anchoring end of the frame and by the bolts 19 at the opposite end of the frame. These handles enable the tray to be easily and quickly handled in placing the tray in and removing the same from a baker's oven. The angle bars of the tray frame are connected at the center by a transverse truss or connecting bar 27 extending across the center of the tray and preferably rectangular in cross section and having its terminals 28 reduced and threaded for the reception of inner and outer nuts 29 and 30. The threaded portions of the truss rod pierce the inner side clamping bars, the side marginal portions of the screen bottom and the upwardly extending wings or flanges of the angle side bars and the inner and outer nuts engage the inner clamping bar and the outer face of the vertical wing or flange of the angle side bars respectively. The truss rod forms a rigid central connection and maintains the central portions of the angle side bars in proper spaced relation and prevents any lateral displacement of the angle side bars either inwardly or outwardly.

What is claimed is.

1. A tray for bakers' ovens, comprising side bars, a screen bottom supported at its edges on the side bars, a pair of transverse end bars aranged flat-wise one upon the other at one end of the side bars and permanently connected to the latter and receiving the screen bottom between them, means piercing said transverse bars and the screen bottom whereby to clamp the latter between the transverse bars, a second pair of transverse bars adjacent the opposite ends of the side bars and slidable on the latter and arranged to provide a vertical space between them to clamp the corresponding end of the screen bottom between them, a third pair of transverse bars arranged flat-wise one upon the other, and permanently secured to the side bars adjacent said slidable pair of transverse bars and each having coincident grooves forming guides, and bolts connected to said second pair of transverse bars and adjustably mounted in said guides whereby to pull upon said second pair of transverse bars to stretch the screen bottom.

2. A tray for bakers' ovens, comprising side bars, a screen bottom supported at its edges on the side bars, a pair of transverse end bars arranged flat-wise one upon the other at one end of the side bars and permanently connected to the latter and receiving the screen bottom between them, means piercing said transverse bars and the screen bottom whereby to clamp the latter between the transverse bars, a second pair of transverse bars adjacent the opposite ends of the side bars and slidable on the latter and arranged to provide a vertical space between them to clamp the corresponding end of the screen bottom between them, a third pair of transverse bars arranged flat-wise one upon the other, and permanently secured to the side bars adjacent said slidable pair of transverse bars and each having coincident grooves forming guides, bolts connected to the second pair of transverse bars and adjustably mounted in said guides whereby to pull upon said second pair of transverse bars to stretch the screen bottom, and a transverse truss rod piercing the said bars and having threaded terminals provided with inner and outer nuts at the inner and outer faces of the said bars.

3. A tray for bakers' ovens, including a frame comprising side bars and end pairs of connecting bars, the pair of connecting bars at one end having guide ways therein, another pair of bars slidable on the side bars adjacent the pair of end bars which have the guide-ways therein, means slidable in the guide ways and connected to the slidable bars and to the screened bottom and operable to effect a stretching of the screen bottom, and a transverse truss rod piercing the side bars and having threaded terminals provided with inner and outer nuts clamping the frame at the inner and outer faces of the side bars.

4. A tray for bakers' ovens, including a frame comprising side bars and end connecting bars, a screen bottom secured to the side bars and anchored at one end of the frame and adjustably connected with the frame at the other end thereof, and a transverse truss rod piercing the side bars and having threaded terminals provided with inner and outer nuts clamping the frame at the inner and outer faces of the side bars.

In testimony whereof I have hereunto set my hand.

GEORGE MUELLER.